(12) United States Patent
Kim

(10) Patent No.: US 9,475,489 B2
(45) Date of Patent: Oct. 25, 2016

(54) METHOD AND SYSTEM FOR CONTROLLING RUNNING MODE CHANGE FOR HYBRID VEHICLE

(71) Applicants: Hyundai Motor Company, Seoul (KR); Kia Motors Corporation, Seoul (KR)

(72) Inventor: Sang Joon Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 112 days.

(21) Appl. No.: 13/967,652

(22) Filed: Aug. 15, 2013

(65) Prior Publication Data

US 2014/0163790 A1 Jun. 12, 2014

(30) Foreign Application Priority Data

Dec. 7, 2012 (KR) ........................ 10-2012-0142063

(51) Int. Cl.
*B60K 6/48* (2007.10)
*B60W 20/00* (2016.01)
*B60W 10/02* (2006.01)
*B60W 10/08* (2006.01)

(52) U.S. Cl.
CPC ............... *B60W 20/40* (2013.01); *B60K 6/48* (2013.01); *B60W 10/02* (2013.01); *B60W 10/08* (2013.01); *B60K 2006/4825* (2013.01); *B60W 2710/081* (2013.01); *Y02T 10/6221* (2013.01); *Y02T 10/6252* (2013.01); *Y10S 903/902* (2013.01)

(58) Field of Classification Search
CPC .... B60W 10/08; B60W 20/40; B60W 20/30; B60W 30/20; B60W 2030/203; B60W 2030/206; B60W 10/02; B60W 2710/081; B60K 6/48; B60K 2006/4825; Y10S 903/902; Y10S 903/912
USPC ................ 180/65.21, 65.23, 65.265, 65.275, 180/65.28, 65.285; 477/5, 6, 8, 13; 701/22, 701/51, 54, 55, 56, 58, 60, 65, 67, 68
See application file for complete search history.

(56) References Cited

U.S. PATENT DOCUMENTS

| 6,317,665 B1 * | 11/2001 | Tabata ................... B60K 6/387 180/65.25 |
| 2003/0029653 A1 * | 2/2003 | Fujikawa ............... B60K 6/365 180/65.25 |
| 2007/0114082 A1 * | 5/2007 | Nozaki .................... B60K 6/48 180/65.6 |

(Continued)

FOREIGN PATENT DOCUMENTS

| JP | 2008105494 A | 5/2008 |
| JP | 2008179235 A | 8/2008 |
| KR | 10-2011-0012572 | 2/2011 |

*Primary Examiner* — Stephen Holwerda
(74) *Attorney, Agent, or Firm* — Mintz Levin Cohn Ferris Glovsky and Popeo, P.C.; Peter F. Corless

(57) ABSTRACT

A method and system for controlling a running mode change that prevent shock generated when releasing an engine clutch in changing from a running mode to another running mode. The method includes detecting, by a controller, a running mode change occurring in the hybrid vehicle and determining whether to change a state of the engine clutch from a lock-up state to an open state while the running mode change is being processed. The controller is further configured to slip-control the engine clutch to prevent torque occurring at a point in time when the engine clutch is changed to the open state from being transmitted to a driving shaft connected to the transmission, when the state of the engine clutch is determined to be changed from the lock-up state to the open state.

11 Claims, 7 Drawing Sheets

(56) References Cited

U.S. PATENT DOCUMENTS

2007/0278022 A1* 12/2007 Tanishima ............. B60K 6/383
　　　　　　　　　　　　　　　　　　　　180/65.285

2010/0286858 A1* 11/2010 Otokawa ................ B60K 6/365
　　　　　　　　　　　　　　　　　　　　701/22

* cited by examiner

METHOD AND SYSTEM FOR CONTROLLING RUNNING MODE CHANGE FOR HYBRID VEHICLE

CROSS-REFERENCE TO RELATED APPLICATION

This application claims priority to and the benefit of Korean Patent Application No. 10-2012-0142063 filed in the Korean Intellectual Property Office on Dec. 7, 2012, the entire contents of which are incorporated herein by reference.

BACKGROUND (a) Field of the Invention

The present invention relates to a method and a system for controlling a running mode change for a hybrid vehicle, which includes processing release of an engine clutch for a hybrid vehicle. More particularly, the present invention relates to a method and a system for controlling a running mode change for a hybrid vehicle that prevents a shock from being generated when releasing an engine clutch when changing from one running mode to another running mode.

(b) Description of the Related Art

Hybrid electric vehicles operate through the use of power from an internal combustion engine and power from a battery. In particular, hybrid vehicles are designed to efficiently combine and use power of the internal combustion engine and a motor. For example, as illustrated in FIG. 1, a hybrid vehicle includes an engine 10, a motor 20, an engine clutch 30, a transmission 40, a differential gear unit 50, a battery 60, an integrated starter-generator (ISG) 70, and wheels 80. The engine clutch 30 controls power transmission between the engine 10 and the motor 20, and the integrated starter-generator (ISG) 70 starts the engine 10 or generates electric power by output of the engine 10.

As further shown, the hybrid vehicle includes a hybrid control unit (HCU) 200 which operates the hybrid electric vehicle; an engine control unit (ECU) 110 operates the engine 10; a motor control unit (MCU) 120 operates the motor 20; a transmission control unit (TCU) 140 operates the transmission 40; and a battery control unit (BCU) 160 which operates the battery 60. The battery control unit 160 may also be referred to as a battery management system (BMS). The integrated starter-generator 70 may also be referred to as a starting/generating motor or a hybrid starter-generator.

The hybrid vehicle may be operated in a driving mode, such as an electric vehicle (EV) mode entirely using power of the motor 20, a hybrid electric vehicle (HEV) mode using torque of the engine 10 as main power and torque of the motor 20 as auxiliary power, and a regenerative braking (RB) mode during braking or when the vehicle runs by inertia. In the RB mode, braking and inertia energy are collected through power generation of the motor 20, and the battery 60 is charged with the collected energy.

The hybrid vehicle may change a running mode according to a running state while being driven. When a running mode of a hybrid vehicle is changed from an HEV mode to an EV mode or from an HEV mode to an RB mode, the engine clutch 30 is released, thus power connection between the engine 10 and the motor 20 is cut off. When a running mode of a hybrid vehicle is changed from an HEV mode to an EV mode or from an HEV mode to an RB mode, operation of the engine 10 is stopped.

While the engine clutch 30 is released, the engine clutch 30 operates as illustrated in FIG. 2. For example, a state of the engine clutch 30 may be changed from a lock-up state (FIG. 2 (A)), through a slip state (FIG. 2 (B)), and to an open state (FIG. 2 (C)). In the lock-up state (FIG. 2 (A)) of the engine clutch 30, since the engine 10 generates mechanical friction torque by inertia rotation power, torque transmitted to the motor 20 and a driving shaft does not exist. However, when passing through the slip state (FIG. 2 (B)), friction torque may transiently occur in the engine clutch 30. The transient friction torque is transmitted to the motor 20 and the driving shaft, thereby causing a shock. The shock may negatively affect drivability.

The above information disclosed in this section is only for enhancement of understanding of the background of the invention and therefore it may contain information that does not form the prior art that is already known in this country to a person of ordinary skill in the art.

SUMMARY

The present invention provides a method and a system for controlling a running mode change for a hybrid vehicle having advantage of preventing shock generated when releasing an engine clutch when changing from one running mode to another running mode.

An exemplary embodiment of the present invention provides a method of controlling a running mode change for a hybrid vehicle which includes an engine clutch that controls power transmission between an engine and a motor, and a transmission clutch that connects the motor and an input shaft of a transmission, the method may include: detecting, by a controller, a running mode change of the hybrid vehicle; determining, by the controller, whether to change a state of the engine clutch from a lock-up state to an open state while the running mode change is being processed; slip-controlling, by the controller, the engine clutch to prevent the torque occurring when the engine clutch is changed to the open state from being transmitted to a driving shaft connected to the transmission, when the state of the engine clutch is determined to be changed from the lock-up state to the open state; operating, by the controller, the motor at a target speed to correspond to the running mode change; and synchronizing, by the controller, speed of the motor with input speed of the transmission clutch by operating the motor.

The running mode change when the state of the engine clutch is determined to be changed from the lock-up state to the open state may be a change from an HEV (hybrid electric vehicle) mode to an EV (electric vehicle) mode. Further, the running mode change when the state of the engine clutch is determined to be changed from the lock-up state to the open state may be a change from an HEV (hybrid electric vehicle) mode to an RB (regenerative braking) mode.

While the transmission clutch is in a slip state, torque of the transmission clutch may be independently controlled regardless of torque of the engine clutch and the motor. The motor and the transmission clutch may be controlled to equalize slip transmitting torque of the transmission clutch, a driving torque, and driver demand torque, while slip of the transmission clutch is controlled.

The target speed of the motor may be set as a sum of an input shaft speed of the transmission clutch and a target delta RPM, wherein the target delta RPM may be set based on demand torque and the state of the engine clutch. Pressure supplied to the transmission clutch may be controlled to equalize transmission torque of the transmission clutch and the demand torque. When the running mode is changed from the HEV mode to RB mode, the demand torque may become negative (minus) torque.

Another exemplary embodiment of the present invention provides a system for controlling a running mode change for a hybrid vehicle running by combination of power of an engine and power of a motor, the system may include: an engine clutch configured to control power transmission between the engine and the motor; a transmission clutch configured to connect the motor and an input shaft of a transmission, wherein the transmission clutch may be installed within the transmission; and a control unit configured to operate the motor, the engine clutch, and the transmission clutch to prevent a shock from occurring while changing a running mode.

The control unit may be operated by a predetermined program, and the determined program may include a series of commands for performing a method that may include: detecting a running mode change of the hybrid vehicle; determining whether to change a state of the engine clutch from a lock-up state to an open state while the running mode change is being processed; and slip-controlling the engine clutch to prevent torque occurring at a point in time when the engine clutch is changed to the open state from being transmitted to a driving shaft connected to the transmission, when the state of the engine clutch is determined to be changed from the lock-up state to the open state.

As described above, according to an exemplary embodiment of the present invention, it may be possible to prevent a shock from being generated when controlling a running mode change, which includes process releasing an engine clutch of a hybrid vehicle. In addition, according to the exemplary embodiment of the present invention, it may be possible to enhance drivability by preventing a shock that may occur according to a state change of the engine clutch while the running mode is being changed in the hybrid vehicle.

DETAILED DESCRIPTION

Figure 1:
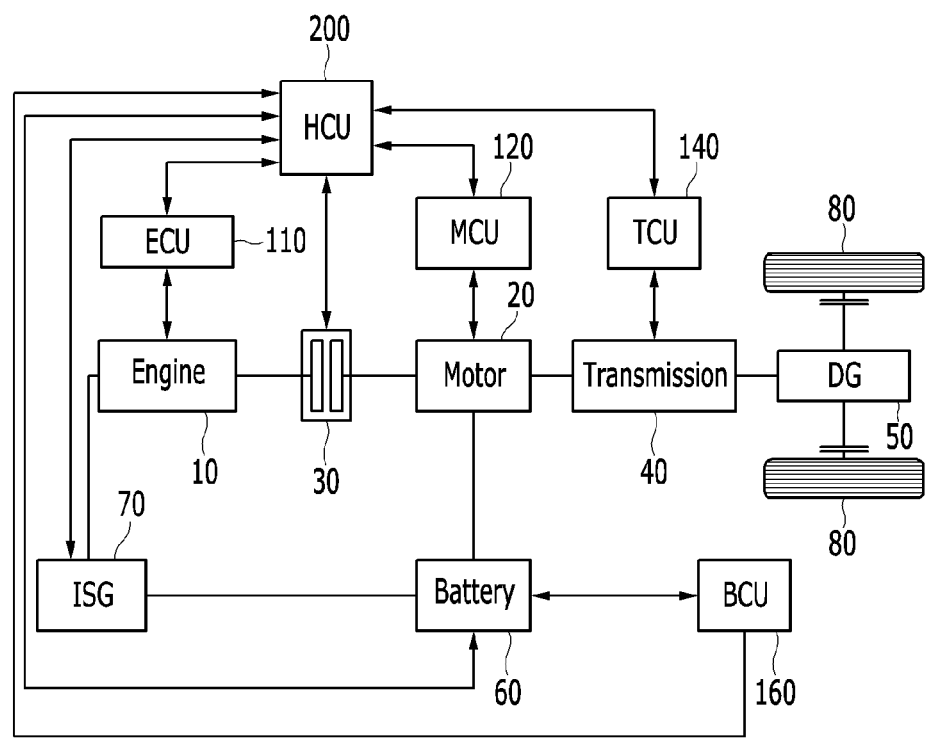
FIG. 1 is an exemplary schematic diagram illustrating a configuration of a typical hybrid vehicle according to the related art.
Figure 2:
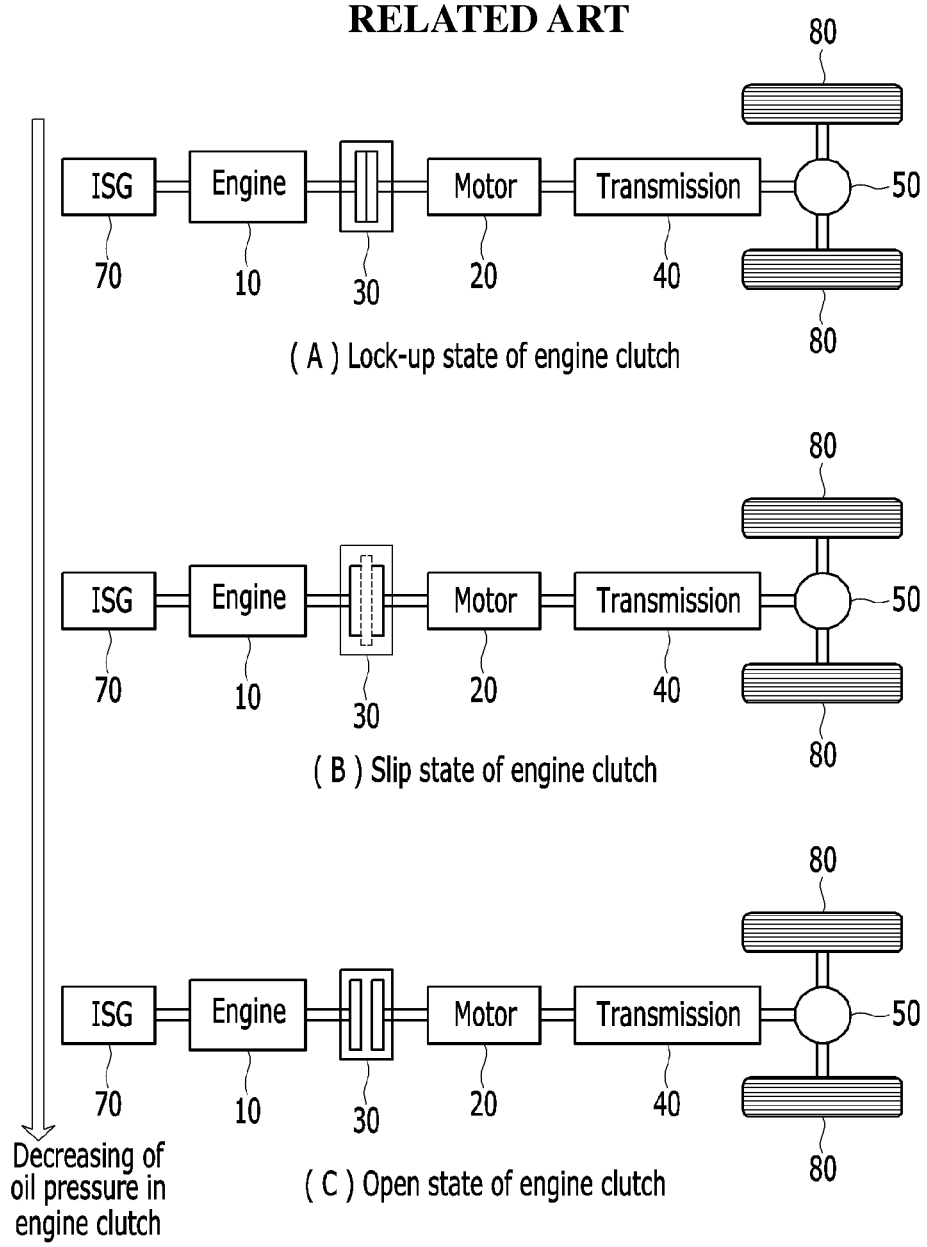
FIG. 2 is an exemplary schematic diagram illustrating a state of changing processes of an engine clutch from a lock-up state, through a slip state, and to an open state according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. As those skilled in the art would realize, the described embodiments may be modified in various different ways, all without departing from the spirit or scope of the present invention. Further, throughout the specification, like reference numerals refer to like elements.

FIG. 1 is an exemplary schematic diagram illustrating a configuration of a typical hybrid vehicle to which a system for controlling a running mode change according to an exemplary embodiment of the present invention may be applied.

As illustrated in FIG. 1, the typical hybrid vehicle to which the system for controlling the running mode change according to the exemplary embodiment of the present invention may be applied includes: an engine 10, a motor 20, an engine clutch 30 configured to control power transmission between the engine 10 and the motor 20, a transmission 40, a differential gear unit 50, a battery 60, and an integrated starter-generator (ISG) 70 configured to start the engine 10 or generate electric power by output of the engine 10.

As further shown, the typical hybrid vehicle to which the system for controlling the running mode change according to the exemplary embodiment of the present invention may be applied includes: a hybrid control unit (HCU) 200 which operates the hybrid electric vehicle, an engine control unit (ECU) 110 which operates the engine 10; a motor control unit (MCU) 120 which operates the motor 20; a transmission control unit (TCU) 140 which operates the transmission 40; and a battery control unit (BCU) 160 which operates the battery 60.

Figure 3:
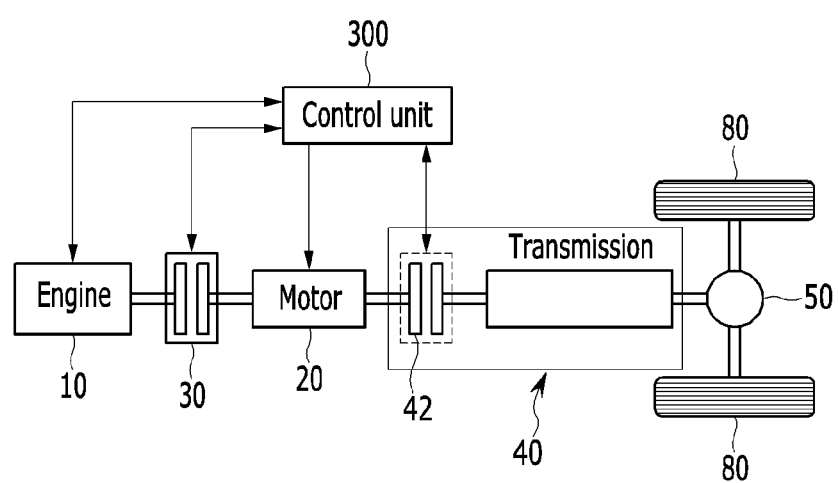
FIG. 3 is an exemplary configuration diagram of a system for controlling a running mode change for a hybrid vehicle according to an exemplary embodiment of the present invention.

FIG. 3 is an exemplary configuration diagram of a system for controlling a running mode change for a hybrid vehicle according to an exemplary embodiment of the present invention. The system for controlling the running mode change for the hybrid vehicle according to the exemplary embodiment of the present invention may prevent a shock associated with releasing of the engine clutch 30 when changing the running mode by slip-controlling a transmission clutch 42 of the transmission 40 when a running mode change state of the engine clutch 30 is determined to be changed from a lock-up state to an open state is performed.

The system for controlling the running mode change for the hybrid vehicle according to the exemplary embodiment of the present invention may include an engine clutch 30 configured to control power transmission between the engine 10 and the motor 20, a transmission clutch 42 configured to connect the motor 20 and an input shaft of the transmission 40, and a control unit 300 configured to operate the motor 20, the engine clutch 30, and the transmission clutch 42 to prevent a shock associated with opening of the engine clutch 30 when changing of the running mode. The transmission clutch 42 may be installed in the transmission 40.

Since the engine 10, the motor 20, the engine clutch 30, the transmission 40, and the transmission clutch 42 are generally installed within typical hybrid vehicles, detailed description will be omitted in the present specification.

The control unit 300 may include one or more processors or microprocessors and/or hardware operated by a program that includes a series of commands for executing a method of controlling a running mode change for a hybrid vehicle according to an exemplary embodiment of the present invention, which will be described below.

Figure 7:
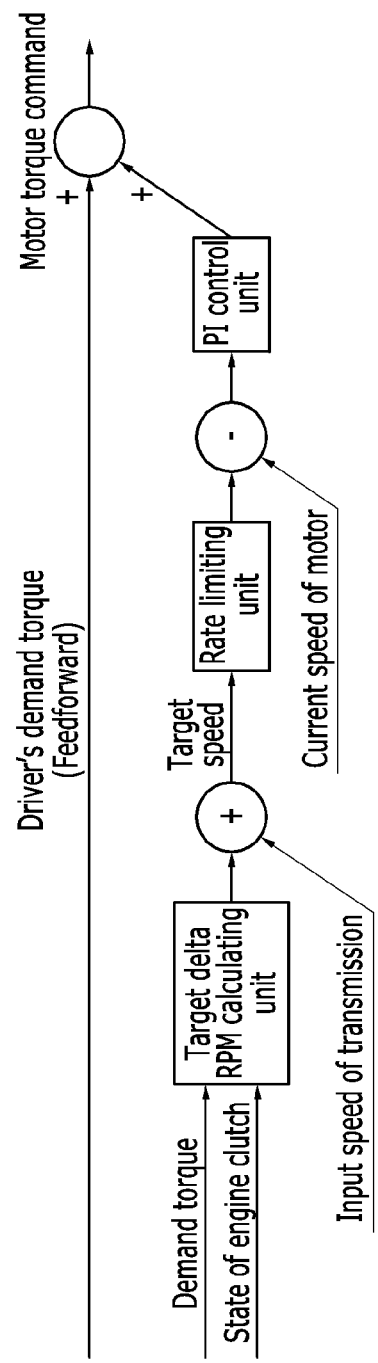

As illustrated in FIG. 7, the control unit 300 may include a target delta RPM calculating unit configured to calculate a target delta RPM based on demand torque and a state of the engine clutch 30, a rate limiting unit configured to limit a target speed, and a proportional integral (PI) control unit configured to feedback operate the motor 20 based on a target speed via the rate limiting unit and a current speed of the motor 20.

In the exemplary embodiment of the present invention, the control unit 300, as illustrated in FIG. 1, may include an engine control unit (ECU) configured to operate the engine 10 of the hybrid vehicle, a motor control unit (MCU) configured to operate the motor 20, a transmission control unit (TCU) configured to operate the transmission 40, and a hybrid control unit (HCU) configured to operate the hybrid vehicle.

In the exemplary method of controlling the running mode change according to the exemplary embodiment of the present invention which will be described below, some processes may be performed by the ECU, other processes may be performed by the MCU, and yet further processes may be performed by the TCU or the HCU. However, it should be understood that the scope of the present invention is not limited to the exemplary embodiment to be described below. The control unit may be implemented with a different combination from that described in the exemplary embodiment of the present invention. Otherwise, the ECU, the MCU, the TCU, and the HCU may perform a different combination of processes from that described in the exemplary embodiment of the present invention.

Hereinafter, a method of controlling a running mode change for a hybrid vehicle according to the exemplary embodiment of the present invention will be described in detail with reference to the accompanying drawings.

Figure 4:
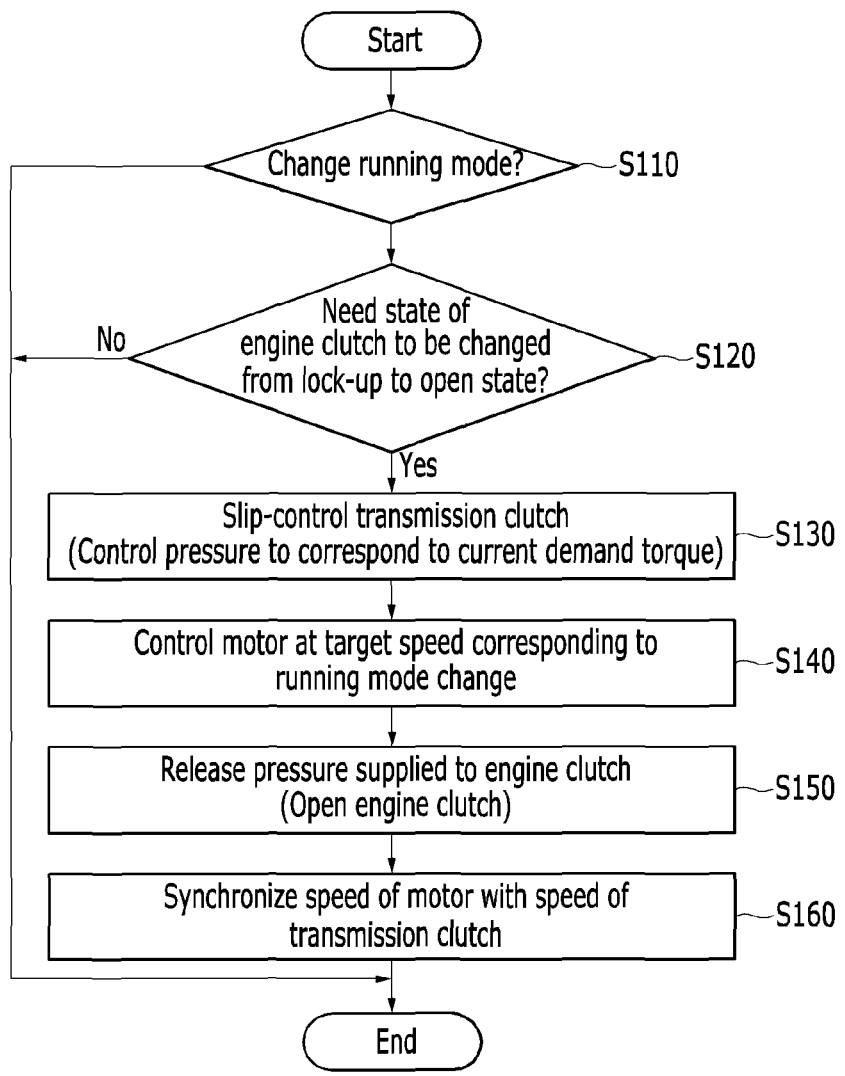
FIG. 4 is an exemplary flowchart of a method of controlling a running mode change for a hybrid vehicle according to an exemplary embodiment of the present invention.

FIG. 4 is an exemplary flowchart of a method of controlling a running mode change for a hybrid vehicle according to an exemplary embodiment of the present invention. As illustrated in FIG. 4, the control unit 300 may be configured to determine whether a running mode of the hybrid vehicle is changed at step S110. The control unit 300 may be configured to determine the running mode change of the hybrid vehicle using a signal of the HCU illustrated in FIG. 1. When the running mode of the hybrid vehicle is changed at step S110, the control unit 300 may be configured to determine whether to change a state of the engine clutch 30 from a lock-up state to an open state while the running mode change is being processed at step S120.

The control unit 300 may be configured to determine, when the running mode is changed from the HEV mode to the EV mode or from the HEV mode to the RB mode, that the state of the engine clutch 30 is determined to be changed from the lock-up state to the open state. When the running mode of the hybrid vehicle is changed from the HEV mode to the EV mode and the state of the engine clutch 30 is changed from the lock-up state to the open state, the control unit 300 may be configured to slip-control the transmission clutch 42 that is installed within the transmission 40 and connects the motor 20 and the input shaft of the transmission 40, and accordingly a shock which occurs in opening of the engine clutch 30 being transmitted to the driving shaft may be prevented, at step S130.

Figure 5:
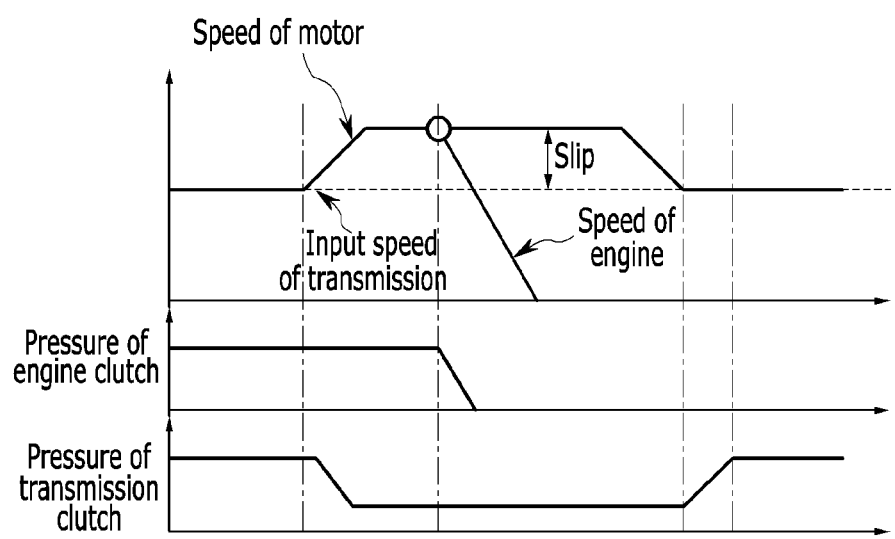
FIGS. 5-7 are exemplary drawings illustrating the method of controlling the running mode change for the hybrid vehicle according to the exemplary embodiment of the present invention.
Figure 6:
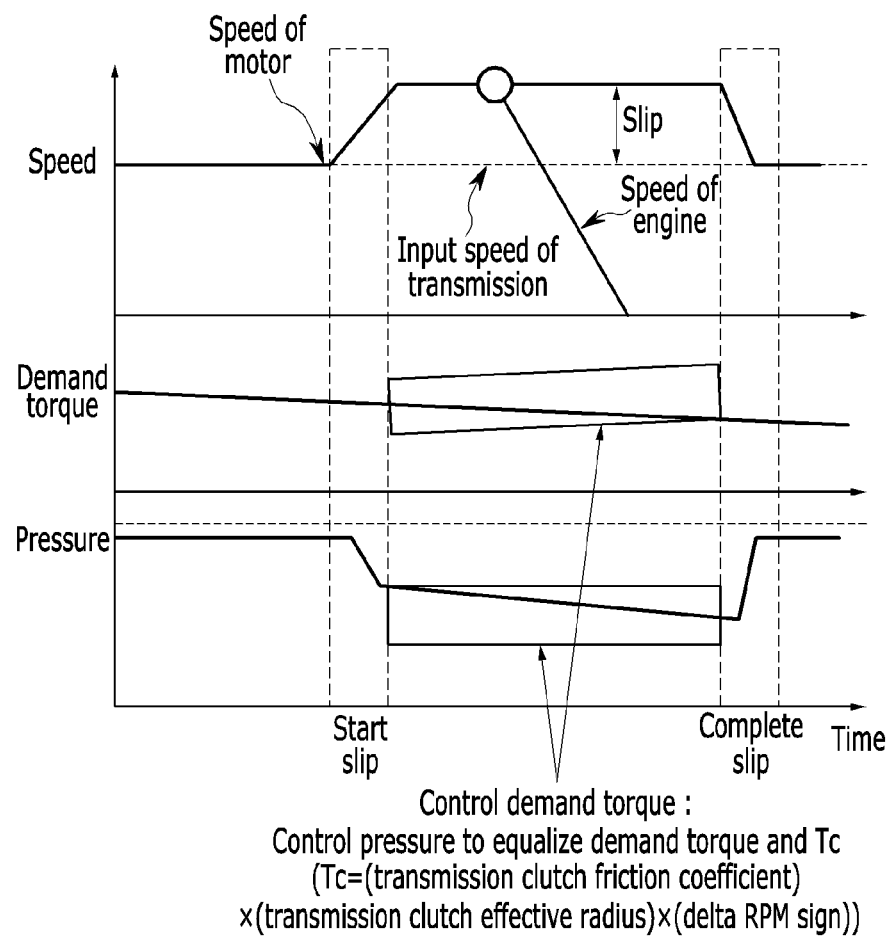

The control unit 300 may be configured to maintain a speed of the motor 20 and a pressure of the transmission clutch 42 at step S130, as illustrated in FIG. 5. When the transmission clutch 42 is slipped, driving torque may be controlled to be equal to transmission torque of the transmission clutch 42. Referring to FIG. 5 and FIG. 6, by slip-controlling of the transmission clutch 42, a shock that occurs in opening of the engine clutch 30 may be processed not to be transmitted to the driving shaft. For the purpose of the slip-controlling of the transmission clutch 42, the control unit 300 may be configured to maintain speed of the motor 20 as described below. For the purpose of satisfying demand torque, the control unit 300 may be configured to slip-control the transmission clutch 42 to equalize the slip transmission torque of the transmission clutch 42, driving torque, and driver's demand torque.

When the HEV mode is changed to the RB mode, negative torque (or minus torque) occurs, and accordingly, as illustrated in FIG. 5, the speed of the motor 20 above the transmission input speed may be controlled to be below the transmission input speed. The control unit 300 may be configured to maintain pressure of the transmission clutch 42 for the purpose of the slip to equalize the transmission torque of the transmission clutch 42 and the demand torque. The transmission torque (Tc) of the transmission clutch 42 may be calculated from the following equation.

$$Tc = (\text{transmission clutch friction coefficient}) \times (\text{transmission clutch effective radius}) \times (\text{delta RPM sign})$$

Wherein, the delta RPM sign is a plus sign (+) or a minus sign (−).

As illustrated in FIG. 6, the control unit 300 may be configured to maintain the pressure of the transmission clutch 42 to cause the transmission torque of the transmission clutch 42 to become the demand torque. In addition, the control unit 300 may be configured to operate the motor 20 at a target speed that corresponds to the current running mode while slip-controlling the transmission clutch 42 at step S140. When the control unit 300 operates the motor 20, the control unit 300 may be configured to release the pressure supplied to the engine clutch 30, to open the engine clutch 30 at step S150. When the engine clutch 30 is opened, the control unit 300 may be configured to synchronize the speed of the motor 30 with the input speed of the transmission clutch 42 (or the input speed of the transmission 40) at step S160.

The control unit 300 may be configured to set the target speed of the motor 20 as a sum of the input shaft speed of the transmission 40 and the target delta RPM, at step S140. The target delta RPM may be set based on the demand torque and the state of the engine clutch 30. A sign of the delta RPM may be set according to the demand torque. For example, when the running mode is changed to the RB mode that generates a negative demand torque, the sign of delta RPM may be a negative value.

In the exemplary embodiment of the present invention, for example, as illustrated in FIG. 7, the control unit 300 may be configured to feedback-operate the motor 20 by using the proportional-integral control unit As illustrated in FIG. 7, the driver's demand torque may be provided by feed-forwarding. Accordingly, it may be possible to change a running mode (e.g., an HEV mode→an EV mode) while preventing a shock in opening of an engine clutch.

While this disclosure has been in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of Reference Numerals | |
| --- | --- |
| 10: | Engine |
| 20: | Motor |
| 30: | Engine clutch |
| 40: | Transmission |
| 42: | Transmission clutch |
| 300: | Control unit |

What is claimed is:

1. A method of controlling a running mode change for a vehicle which includes an engine clutch that controls power transmission between an engine and a motor, and a transmission clutch that connects the motor and an input shaft of a transmission, the method comprising:
    detecting, by a controller, a running mode change of the vehicle;
    determining, by the controller, whether to change a state of the engine clutch from a lock-up state to an open state during the running mode change;
    slip-controlling, by the controller, the transmission clutch to prevent torque occurring when the engine clutch changes to the open state from being transmitted to a driving shaft connected to the transmission, when the state of the engine clutch changes from the lock-up state to the open state;
    operating, by the controller, the motor at a target speed to correspond to the running mode change;
    synchronizing, by the controller, a speed of the motor with an input speed of the transmission clutch by operating the motor; and
    controlling, by the controller, pressure supplied to the transmission clutch to equalize transmission torque of the transmission clutch and demand torque,
    wherein the running mode change when the state of the engine clutch changes from the lock-up state to the open state is a change from a hybrid electric vehicle (HEV) mode to a regenerative braking (RB) mode,
    wherein the transmission torque of the transmission clutch is calculated using equation:

transmission torque=(a friction coefficient of the transmission clutch)×(an effective radius of the transmission clutch)×(a delta RPM sign), and wherein the delta RPM sign is a plus sigh (+) or a minus sign (−).

2. The method of claim 1, further comprising:
    controlling, by the controller, torque of the transmission clutch independently regardless of torque of the engine clutch and the motor while the transmission clutch is in a slip state.

3. The method of claim 1, further comprising:
    controlling, by the controller, the motor and the transmission clutch to equalize slip transmitting torque of the transmission clutch, a driving torque, and driver demand torque, during slip-control of the transmission clutch.

4. The method of claim 1, further comprising:
    setting, by the controller, the target speed of the motor as a sum of an input shaft speed of the transmission clutch and a target delta RPM; and
    setting, by the controller, the target delta RPM based on the demand torque and the state of the engine clutch.

5. The method of claim 1, wherein when the running mode changes from the HEV mode to RB mode, the demand torque becomes negative torque.

6. A system for controlling a running mode change for a vehicle, the system comprising:
    an engine clutch configured to control power transmission between the engine and the motor;
    a transmission clutch configured to connect the motor and an input shaft of a transmission, wherein the transmission clutch is installed within the transmission; and
    a controller configured to:
        detect a running mode change of the vehicle;
        determine whether to change a state of the engine clutch from a lock-up state to an open state while the running mode change is being processed;
        slip-control the transmission clutch to prevent torque occurring at when the engine clutch is changed to the open state from being transmitted to a driving shaft connected to the transmission, when the state of the engine clutch is determined to be changed from the lock-up state to the open state;
        operate the motor at a target speed to correspond to the running mode change; and
        synchronize a speed of the motor with an input speed of the transmission clutch by operating the motor,
    wherein the running mode change when the state of the engine clutch changes from the lock-up state to the open state is a change from a hybrid electric vehicle (HEV) mode to a regenerative braking (RB) mode, wherein the controller is further configured to control pressure supplied to the transmission clutch to equalize transmission torque of the transmission clutch and the demand torque, wherein the transmission torque of the transmission clutch is calculated using equation:

transmission torque=(a friction coefficient of the transmission clutch)×(an effective radius of the transmission clutch)×(a delta RPM), and wherein the delta RPM sign is a plus sigh (+) or a minus sign (−).

7. The system of claim 6, wherein the controller is further configured to control torque of the transmission clutch independently regardless of torque of the engine clutch and the motor while the transmission clutch is in a slip state.

8. The system of claim 6, wherein the controller is further configured to control the motor and the transmission clutch to equalize slip transmitting torque of the transmission clutch, a driving torque, and driver demand torque, during slip-control of the transmission clutch.

9. The system of claim 6, wherein the controller is further configured to:
set the target speed of the motor as a sum of an input shaft speed of the transmission clutch and a target delta RPM; and
set the target delta RPM based on the demand torque and the state of the engine clutch.

10. The system of claim 6, wherein when the running mode changes from the HEV mode to an RB (regenerative braking) mode, the demand torque becomes a negative torque.

11. A non-transitory computer readable medium containing program instructions executed by a controller, the computer readable medium comprising:
program instructions that detect a running mode change of a vehicle;
program instructions that determine whether to change a state of an engine clutch from a lock-up state to an open state while the running mode change is being processed;
program instructions that slip-control a transmission clutch to prevent torque occurring when the engine clutch is changed to the open state from being transmitted to a driving shaft connected to a transmission, when the state of the engine clutch is determined to be changed from the lock-up state to the open state;
program instructions that operate a motor at a target speed to correspond to the running mode change;
program instructions that synchronize a speed of the motor with an input speed of the transmission clutch by operating the motor; and
program instructions that control pressure supplied to the transmission clutch to equalize transmission torque of the transmission clutch and demand torque, wherein the running mode change when the state of the engine clutch changes from the lock-up state to the open state is a change from a change from a hybrid electric vehicle (HEV) mode to a regenerative braking (RB) mode, wherein the engine clutch controls power transmission between the engine and the motor, and the transmission clutch connects the motor and an input shaft of a transmission, wherein the transmission torque of the transmission clutch is calculated using equation:

transmission torque=(a friction coefficient of the transmission clutch)×(an effective radius of the transmission clutch)×(a delta RPM), and wherein the delta RPM sign is a plus sigh (+) or a minus sign (−).

* * * * *